Nov. 29, 1949 — F. J. RAYBOULD — 2,489,929
ANTICREEP BRAKE CONTROL
Filed Jan. 30, 1947 — 4 Sheets-Sheet 1
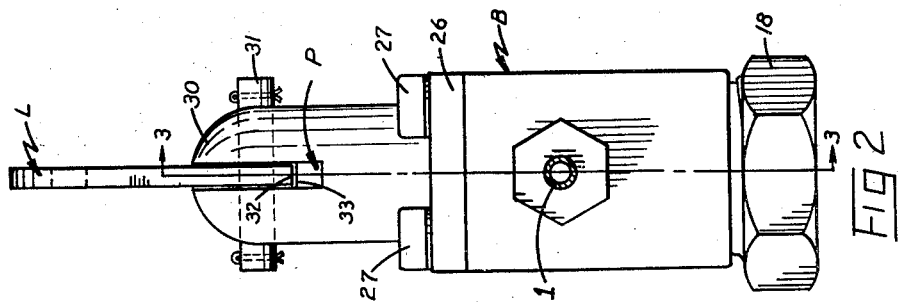
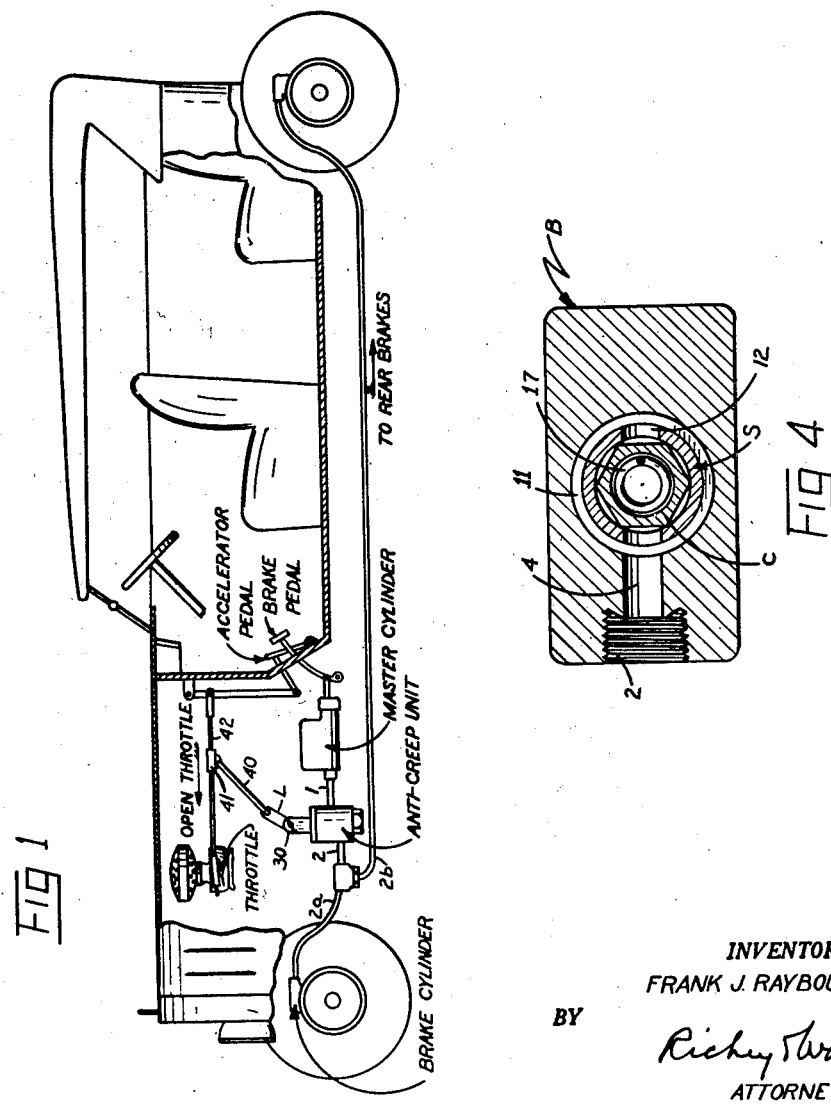
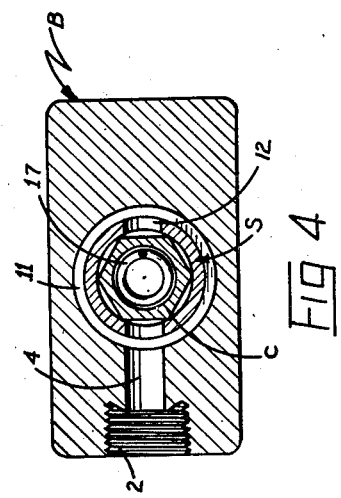
INVENTOR.
FRANK J. RAYBOULD
BY
*Richey & Watts*
ATTORNEYS Nov. 29, 1949　　　　　F. J. RAYBOULD　　　　2,489,929
ANTICREEP BRAKE CONTROL
Filed Jan. 30, 1947　　　　　　　　　　　　　4 Sheets-Sheet 2
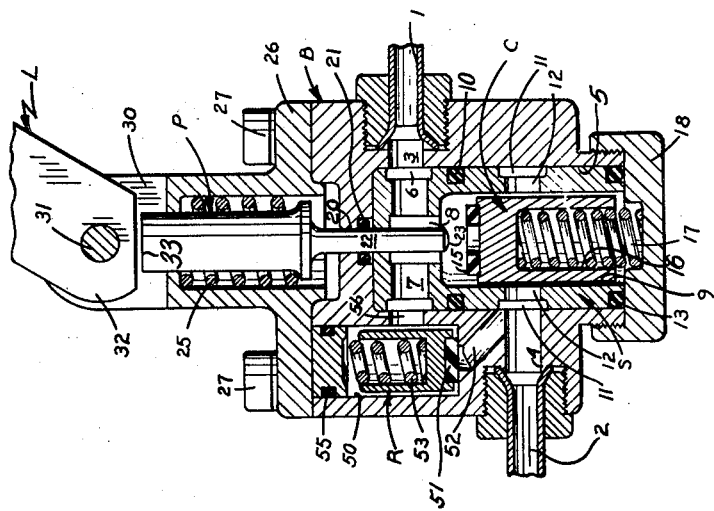
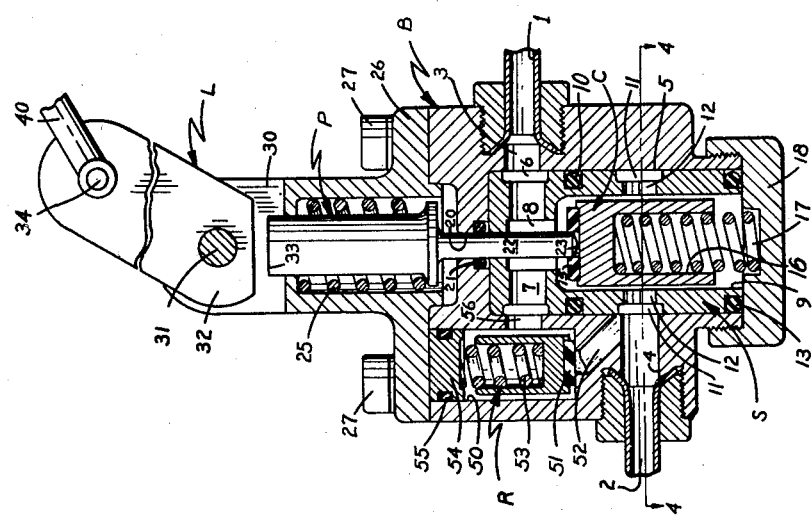
INVENTOR.
FRANK J. RAYBOULD
BY
*Richey & Watts*
ATTORNEYS Nov. 29, 1949          F. J. RAYBOULD                2,489,929
                     ANTICREEP BRAKE CONTROL
Filed Jan. 30, 1947                              4 Sheets-Sheet 3
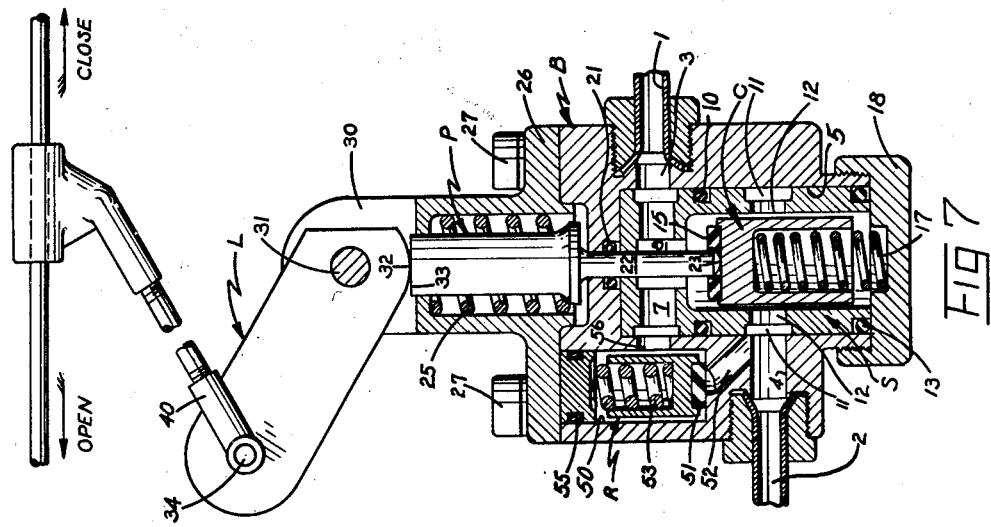
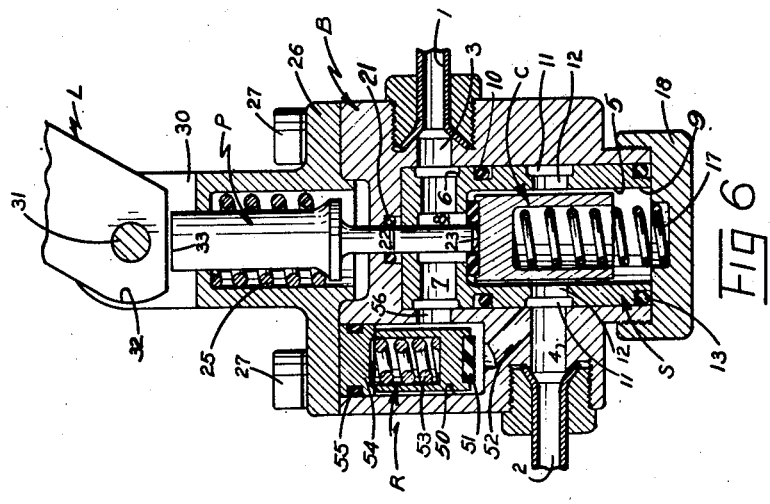
INVENTOR.
FRANK J. RAYBOULD
BY
*Richey & Watts*
ATTORNEYS Nov. 29, 1949   F. J. RAYBOULD   2,489,929
ANTICREEP BRAKE CONTROL
Filed Jan. 30, 1947   4 Sheets-Sheet 4

INVENTOR.
FRANK J. RAYBOULD
BY
Richey & Watts
ATTORNEYS

Patented Nov. 29, 1949

2,489,929

UNITED STATES PATENT OFFICE 2,489,929

ANTICREEP BRAKE CONTROL

Frank J. Raybould, Lakewood, Ohio, assignor to The Weatherhead Company, Cleveland, Ohio, a corporation of Ohio Application January 30, 1947, Serial No. 725,241

14 Claims. (Cl. 188—152)

This invention relates generally to vehicle brakes and more specifically to automatic hill-holding or anti-creep devices for hydraulic brakes.

The device to which this invention relates is basically a hydraulic unit for insertion in the hydraulic brake lines between the master cylinder and the brake cylinders. Under conditions which will be described presently, the device traps pressure resulting from application of the brake thereby retaining the braking pressure on the wheels preventing the vehicle from coasting up and down slight inclines or from creeping under the drag exerted by a fluid coupling with the engine idling.

Prior devices have operated to hold the brakes every time the brake pedal was depressed, it being necessary to step on the accelerator or operate some other control to release the brakes. This is particularly undesirable in operation because if the brakes are used to merely slow down the vehicle (as they are a large percentage of the time) it is objectionable to have the brakes remain set after the pedal has been released. Accordingly, it is an object of this invention to provide an anti-creep brake unit which is not effective to set the brakes when they are applied lightly as when slowing down. If the brakes are merely applied to slow down the vehicle or to turn a corner, my unit will not hold the brakes applied, but if a relatively strong pressure is developed as occurs when the car is brought to a full stop, then my unit functions to keep a pressure on the brakes and prevent creep of the vehicle.

It is another object of this invention to provide a brake control unit that traps pressure in the brakes which pressure is less than the normal pressure developed to stop the vehicle. This has several advantages in that if the car is parked it can be pushed or moved, the brakes just being applied enough to prevent creeping under the influence of a fluid clutch or on a slight up or down grade. Another advantage of this construction lies in the fact that if the car is left standing with the brakes locked the trapped pressure is relatively low and will not tend to damage the brake lines or cause leakage.

Another object of a preferred embodiment of this invention is to provide a brake control unit which automatically releases the brakes when the operator of the vehicle operates his controls preparatory to re-starting the vehicle without resort to complex electrical or mechanical systems. For example, in one embodiment of my invention the brake control mechanism is automatically released when the operator steps on the accelerator preparatory to starting due to a simple linkage between the anti-creep unit and the accelerator linkage.

In another embodiment the mechanism is automatically released when the engine is speeded up due to a simple electrical connection between the generator and a pressure switch in the brake line.

Another object is to provide a unit which is simple to manufacture, dependable, and which requires a minimum of modification of the existing hydraulic brake system. For example, my unit can be fitted into the system by merely inserting it in the line between the master cylinder and the brakes. The unit is designed so that the brake line is normally opened and can only be closed by bringing the vehicle to a stop. Furthermore, the unit is designed so that upon starting the vehicle the brake lines are again opened which features insure dependability and safety of operation.

Another object is to provide a brake control unit which is independent of the clutch pedal, i. e., which functions whether the clutch is engaged or disengaged, the only means of locking the brakes with the unit being a relatively hard pressure upon the brake pedal.

Still another object lies in the provision of a brake unit which is not only automatic but which is under the control of the operator. In my invention the operator can always set the automatic unit by pressing firmly on the brake pedal to develop a pressure such as that normally employed in stopping the vehicle or he can avoid setting the brakes by applying a lighter pressure to the pedal. Thus, even though the vehicle were at rest the anti-creep mechanism could be set by a hard application of the brake pedal.

These and other objects will be apparent as the following detailed description of my invention proceeds.

In the drawings:

Fig. 1 is a schematic diagram showing the location and interconnection of parts in a preferred embodiment;

Fig. 2 is an end elevation of the hydraulic control unit;

Fig. 3 is a vertical section through the unit in its normal condition, i. e., with the brake lines open;

Fig. 4 is a transverse section on 4—4 of Fig. 3;

Fig. 5 is a section through the unit taken when pressure is applied from the master cylinder as when the brake pedal is firmly depressed in order to stop the vehicle;

Fig. 6 is a section showing the unit with the pressure sealed in the lines to the wheel brakes but with pedal pressure released;

Fig. 7 is a section showing how the opening of the throttle releases the pressure sealed in the wheel brakes so that the vehicle can begin moving.

Figure 8:
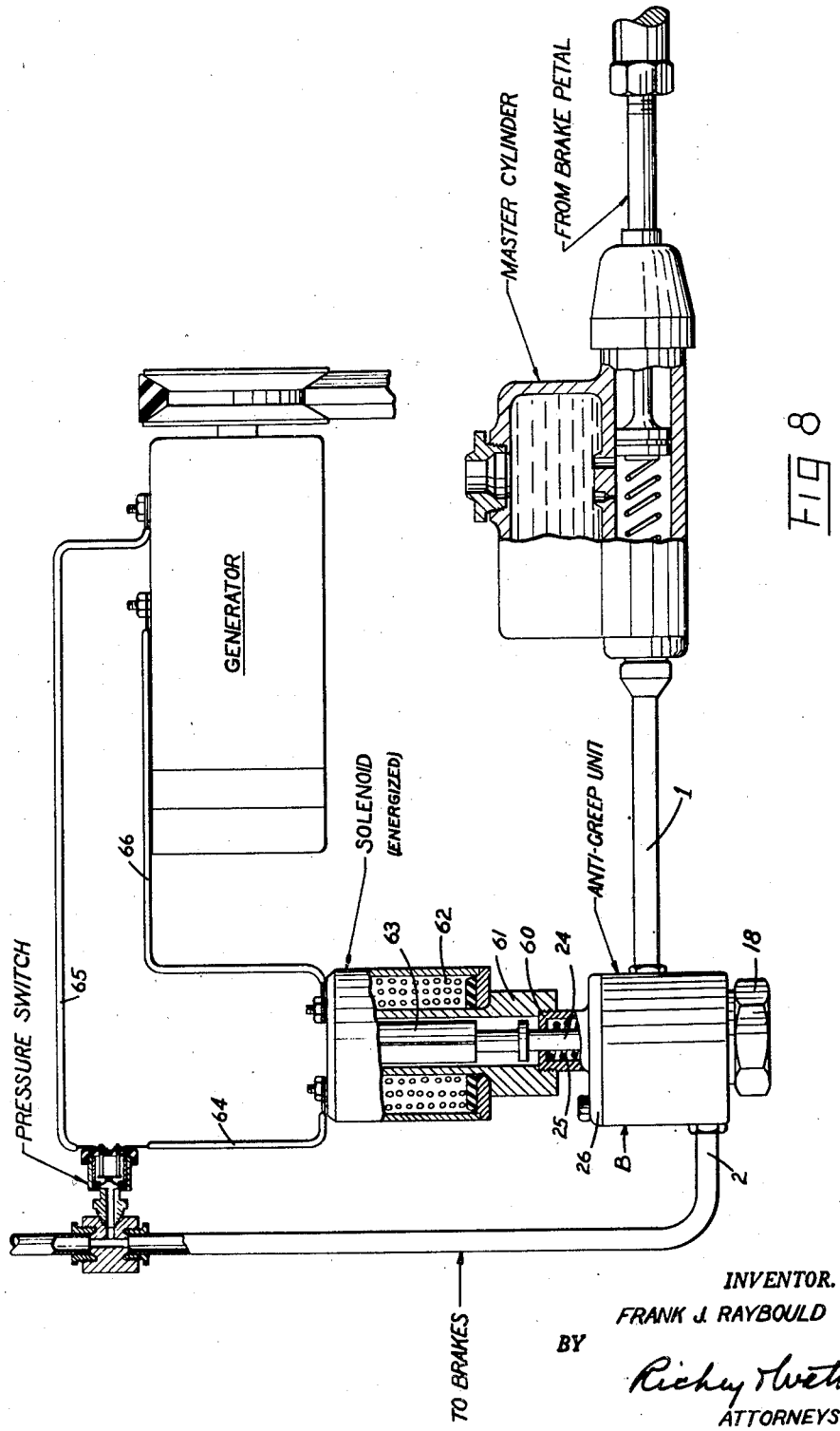
Fig. 8 is a diagram showing a modified installation wherein the control unit is electrically controlled rather than mechanically.

As seen in Fig. 1, the preferred embodiment, the anti-creep unit B is inserted in the brake line so that a line 1 from the master cylinder is connected thereto and a line 2 leads to lines 2a and 2b to the front and rear wheel brakes respectively. The control mechanism which will be described presently includes a lever L pivoted to member 30 on the control unit and linked by link 40 and attaching member 41 to a rod 42 that controls the throttle. The arrangement is such that when the accelerator pedal is depressed lever L is pivoted in a counter-clockwise direction in the drawings. However, it is understood that the linkage shown is merely one of many arrangements which could be employed to operate the unit, the exact linkage depending largely upon the vehicle in which it is installed.

The brake control unit includes body B into which fluid passageway 3 is provided for connecting to line 1 that leads to the master cylinder. Another fluid passageway 4 is provided for connection to the line 2 that leads to the brakes. The body is chambered as at 5 to receive a sleeve member S, which member acts largely to provide ports and channels on the body and is made separately therefrom in interests of economical manufacture. The sleeve S is formed with an annular groove 6 which communicates with one or more ports 7 leading to its interior. The sleeve has an inner chamber 8 which communicates with a larger chamber 9 occupying the majority of the sleeve's length. The annular groove 6 is sealed off from the lower portion of the unit by an O-ring or packing member 10. A second lower annular groove 11 is also formed on the sleeve which, by means of ports 12, communicates with a chamber 9 within the sleeve. The lower end of the sleeve is hydraulically sealed by an O-ring or packing member 13.

Within chamber 9 is slidably supported a check valve C which may be of hexagonal cross section to permit fluid to flow past the valve from chamber 8 to port 12 and hence trap fluid in the brake lines. A soft washer 15 is carried by the check valve to provide a seal with a seat surrounding chamber 8 on the sleeve. The check valve is counter-bored as at 16 to receive spring 17 which normally urges it closed and the sleeve, check valve and spring assembly are all retained in the body by means of a cap nut 18.

In order to provide means to unseat the check valve, the body is bored as at 20 to receive stem 22 of a plunger P slidably mounted in the body. A sealing ring 21 prevents fluid from escaping around the stem. The lower end 23 of the plunger may engage check valve C and hold it off its seat. The upper portion 24 is flanged to receive a compression spring 25, one end of which engages the flange on the plunger and the other end engages an upper wall in the cap 26 of the unit. The cap may be retained by four bolts or cap screws 27 to the body. The spring 25 urging the plunger down is stronger than the spring 17 urging the check valve closed so that the plunger, by its engagement at 23, normally holds the check valve open establishing fluid communication between the master cylinder and the brake lines.

The third movable member in the unit is the automatic regulating relief valve R which slides freely in the chamber 50 provided in the body in order to reduce the pressure trapped in the brake lines. This valve is also of non-circular cross section to permit fluid flow past its sides and carries a sealing washer 51 which seals off the chamber 50 from a port 52 that forms part of a passageway to by-pass fluid from the brake lines to the outlet port 4. Calibrated spring 53 normally urges the check valve closed and washer 54 and packing 55 seal chamber 50 from escape of fluid. The chamber 50 communicates with the inlet port by means of port 56 in the body wall which connects with annular groove 6 and port 7 in the sleeve completing the by-pass passageway.

In normal operation, the unit is disposed as shown in Fig. 3 with the plunger unseating the check valve so that there is free communication between the master cylinder and the brake lines. When, as shown in Fig. 5, the brakes are applied with a certain predetermined force in order to stop the vehicle, check valve C is moved down somewhat and the pressure developed in the line acting against lower face 23 of the plunger is high enough to overcome the loading of spring 25 and lift the plunger against the force of plunger spring 25. By way of example, assume that the pressure developed in the brake lines is 175 pounds as the vehicle is brought to a stop. With pedal pressure maintained check valve C will move, as seen in Fig. 5, until pressure above and below it is equalized, whereupon spring 17 may close valve C because pedal pressure has lifted plunger 22 clear. If the brake pedal is released, pressure above valve C drops but that below valve C, plus the force of spring 17, holds C closed against the force of spring 25, thereby trapping pressure in the brake lines. Almost the full pressure of 175 p. s. i. would be trapped in the brake lines were it not for the relief valve R which is set to open at a lower pressure and accordingly instantaneously opens (as in Fig. 6) to relieve pressure down to a predetermined value adequate for anti-creep purposes or for holding the car on a slight grade. For example, the spring 53 might be calibrated to relieve pressure in the brake line down to 80 p. s. i. which would be adequate to perform the anti-creep or hill-holding brake function. During normal driving, if the brakes are applied to slow down the vehicle the pressure might not rise in line 1 to a value high enough to lift the plunger P whereupon when the brakes are released the check valve seat cannot seat.

As seen in Fig. 7, if the throttle is depressed, lever L is pivoted counter-clockwise so that cam surface 32 on the lever engages the upper end 33 of the plunger P and moves it downwardly against spring 17 to unseat the check valve. Thus, if the brakes have been set by the anti-creep unit, the brakes are released before the car begins moving and normal operation is resumed with all brake lines open. It can also be seen that if the car is stationary and the brakes are not set by the unit, a firm pressure on the brake pedal followed by a release thereof will trap a reduced pressure in the brake lines that will be maintained (except for gradual leakage) until the throttle is depressed.

Fig. 8 is a diagram of a modified embodiment of my invention. A solenoid is substituted for the cam shown in the preferred embodiment, the arrangement being such that energization of the solenoid depresses plunger 24 of the control unit and holds the check valve open, it being understood that the control unit itself is like that previously described. The solenoid may be attached to an upper portion 60 of the cap 26 by means of a central column or sleeve 61. The solenoid has windings as shown at 62, and a plunger 63. When the windings are energized the plunger moves downwardly to unseat the check valve. One terminal 64 of the solenoid connects to one terminal of a pressure sensitive switch, which switch is inserted in the line from the control unit to the brakes. The switch, in turn, connects by lead 65 to one terminal of the conventional vehicle electric generator. Lead 66 connects the other generator terminal to the other solenoid terminal.

In operation, when the brakes are applied hard and the vehicle brought to a stop, plunger 24 is lifted as described before, and when the brake pedal is released the pressure is trapped in line 2 to perform the anti-creep function. However, if the car is moving at normal driving speeds with the engine running or in gear, even though brake pressure is applied great enough to lift the plunger 24 to permit the valve to seat, the same pressure closes the pressure switch in the line and causes energization of the line by the generator. With the car moving the generator supplies ample voltage and current to energize the solenoid and hold the plunger 24 down and keep the valve unseated. Thus, when the brakes are released under these conditions, pressure in the brake line cannot seat the check valve. The pressure operated switch is set to operate at a relatively low pressure so that it will remain closed so long as there is enough pressure in the line to provide a reasonably effective braking action. Thus, the brakes can be released at any time by accelerating the engine. However, with the engine running slowly or idling, the circuit and solenoid windings are designed so that the generator generates insufficient current to hold the plunger 24 down against pressure generated under the check valve by application of the brakes. Under these conditions when the brake is released the pressure in the brake lines seats the check valve and the anti-creep function is performed. Of course, accelerating the engine energizes the solenoid through the switch and unseats the valve. With no pressure in the brake lines the switch is open and no current is consumed.

It is apparent the absolute values of (a) the pressure required to take up the slack in the system and render it operative; (b) the pressure trapped in the line by the anti-creep unit; and (c) the pressure required to set the anti-creep unit, may vary over wide limits depending upon the nature of the brake system, the inertia of the braked elements, the desired rate of deceleration, and the desired anti-creep pressure. For these reasons neither the various absolute nor the various relative pressures involved are specified in the specification and appended claims. However, it is clear that the trapped pressure (b) mentioned above will at least be equal to and more likely greater than pressure (a) required to render the brake operative and as mentioned in the description it is important that the pressure (c) required to set the anti-creep unit be the highest pressure in order that the operator has control over setting of the unit. Accordingly, it is contemplated that the claims will be construed in the light of these considerations.

Although I have illustrated a preferred embodiment and a modification of my invention, I contemplate that modifications thereof may be made without departing from the spirit of the invention. It is clear that my invention is adapted for use on machines other than a vehicle. Also, my invention is not limited to connection of the lever L to an acceleration pedal of a vehicle because such connection is not critical to the mode of operation of the device in its broader aspects. The installation expedients employed would depend upon the design of the particular vehicle and since these do not affect the over-all operation of the device nor its basic construction, no attempt has been made to illustrate detailed means for installing the units in each of the various machines now marketed.

Accordingly, I contemplate that the claims, and not the preferred embodiment, be determinative of the scope of my invention.

What is claimed is:

1. In combination with a hydraulic brake mechanism including a master cylinder and a brake cylinder, an anti-creep brake control unit in the line between said cylinders, said unit including a passageway for conducting fluid from the master cylinder to the brake line, check valve means biased for closing off the passageway and trapping pressure in the brake line, said check valve means being arranged so that one face is subject to pressure in the master cylinder line and an opposed face of substantially equal effective area is subject to pressure in the brake line at all times, limit means biased for preventing the trapping of pressure in the brake line below the pressure required to render the brake operative, said limit means including an unbalanced area subject to pressure in the master cylinder line at all times and arranged so that pressure on said area opposes the limit means bias so that pressure in the master cylinder tends to render said limit means inoperative, whereupon the bias on said check valve means may close the valve and pressure on said opposed face of said check valve means may hold closed the valve when master cylinder pressure is released and so trapped pressure in the brake line, the bias for said limit means being such that a pressure higher than that required to render the brake operative is required to render said limit means inoperative whereby pressures below a predetermined value are not trapped.

2. In combination with a hydraulic brake mechanism including a master cylinder and a brake cylinder, an anti-creep brake control unit in the line between said cylinders, said unit including a passageway for conducting fluid from the master cylinder to the brake line, check valve means biased for closing off the passageway and trapping pressure in the brake line, said check valve means being arranged so that one face is subject to pressure in the master cylinder line and an opposed face of substantially equal effective area is subject to pressure in the brake line at all times, limit means biased for preventing the trapping of pressure in the brake line below the pressure required to render the brake operative, said limit means including an unbalanced area subject to pressure in the master cylinder line at all times and arranged so that pressure on said area opposes the limit means bias so that pressure in the master cylinder tends to render said limit means inoperative, whereupon the bias on said check valve means may close the valve and pressure on said opposed face of said check valve means may hold closed the valve when master cylinder pressure is released and so trap pressure in the brake line, the bias for said limit means being such that a pressure higher than that required to render the brake operative is required to render said limit means inoperative whereby pressures below a predetermined value are not trapped, and pressure relief means in the brake line to reduce the pressure therein to a predetermined maximum value after brake pressure is released, whereupon said valve traps a predetermined maximum pressure in the brake line, said pressure relief means comprising a spring-loaded valve discharging into said passageway between the valve and the master cylinder.

3. In combination with a hydraulic brake mechanism including a master cylinder and a brake cylinder, an anti-creep brake control unit in the line between said cylinders, said unit including a passageway for conducting fluid from the master cylinder to the brake line, valve means for closing off the passageway and trapping pressure in the brake line, valve limit means biased for preventing the trapping of pressure in the brake line below the pressure required to render the brake operative, means whereby pressure in the master cylinder tends to render said limit means inoperative whereupon said valve may hold pressure in the brake line, the bias for said limit means being such that a pressure higher than that required to render the brake operative is required to render said limit means inoperative, and means in the brake line to reduce the pressure therein to a predetermined lower value after brake pressure is released, and control means for releasing pressure trapped in the brake line, said control means being connected to an associated machine element that is actuated when the braked element is again set in motion.

4. In combination with a hydraulic brake mechanism including a master cylinder and a brake cylinder, an anti-creep brake control unit in the line between said cylinders, said unit including a passageway for conducting fluid from the master cylinder to the brake line, valve means for closing off the passageway and trapping pressure in the brake line, valve unseating means biased for preventing closure of said valve below the pressure required to render the brake operative, means whereby pressure in the master cylinder tends to render said valve unseating means inoperative whereupon said valve may seat and hold pressure in the brake line, the bias for said valve unseating means being such that a pressure higher than that required to render the brake operative is required to render said valve unseating means inoperative, and means in the brake line to reduce the pressure therein to a predetermined maximum value after brake pressure is released, and control means for unseating said valve, said control means being connected to an associated machine element that is actuated when the braked element is against set in motion.

5. In combination with a hydraulic brake mechanism including a master cylinder and a brake cylinder, an anti-creep brake control unit in the line between said cylinders, said unit including a passageway for conducting fluid from the master cylinder to the brake line, valve means for closing off the passageway and trapping pressure in the brake line, valve unseating means biased for preventing closure of said valve below the pressure required to render the brake operative, means whereby pressure in the master cylinder tends to render said valve unseating means inoperative whereupon said valve may seat and hold pressure in the brake line, the bias for said valve unseating means being such that a pressure higher than that required to render the brake operative is required to render said valve unseating means inoperative, and control means for unseating said valve, said control means being connected to an associated machine element that is actuated when the braked element is again set in motion.

6. In combination with a hydraulic brake mechanism including a master cylinder and a brake cylinder, an anti-creep brake control unit in the line between said cylinders, said unit including a passageway for conducting fluid from the master cylinder to the brake line, valve means biased to close off the passageway and trap pressure in the brake line, valve unseating means extending into said passageway and engaging said valve means, said unseating means being biased for preventing closure of said valve below the pressure required to render the brake operative, the relationship of the area of said valve unseating means subjected to pressure and the strength of its bias being such that pressure in the master cylinder lifts said valve unseating means from the valve means permitting the valve to seat and hold pressure in the brake line when a pressure higher than that required to render the brake operative is generated, whereupon said valve seats to trap pressure in the brake line when said higher pressure is released, and a relief valve for by-passing said first valve when pressure in the master cylinder is released, said relief valve being set to prevent pressure in the brake line from exceeding a predetermined maximum value, and control means for operating said valve unseating means, said control means functioning when a control is operated to set the braked element into motion.

7. In combination with a hydraulic brake mechanism including a master cylinder and a brake cylinder, an anti-creep brake control unit in the line between said cylinders, said unit including a passageway for conducting fluid from the master cylinder to the brake line, valve means for closing off the passageway and trapping pressure in the brake line, control means for releasing pressure trapped in the brake line, electric operator means for operating said control means, an electric generator and means to drive it for supplying current to said operator means, whereby pressure trapped in the brake line is released when the generator is driven.

8. In combination with a hydraulic brake mechanism including a master cylinder and a brake cylinder, an anti-creep brake control unit in the line between said cylinders, said unit including a passageway for conducting fluid from the master cylinder to the brake line, valve means for closing off the passageway and trapping pressure in the brake line, control means operable for releasing pressure trapped in the brake line, an electric pressure switch in said brake line, electric operator means controlled by said switch for operating said by-pass means, said electric operator means being arranged to leave said control means inoperable with no current flowing therethrough, an electric generator and means to drive it for supplying current to said operator means, the electrical connections involving said generator, switch and electric operator means, and the arrangement of said switch being such that pressure in said brake line operates said switch to cause said electric generator to be connected to said electric operator means, whereby pressure trapped in the brake line is released when the generator is driven.

9. In combination with a hydraulic brake mechanism including a master cylinder and a brake cylinder, an anti-creep brake control unit in the line between said cylinders, said unit including a passageway for conducting fluid from the master cylinder to the brake line, valve means for closing off the passageway and trapping pressure in the brake line, limit means biased for preventing the trapping of pressure in the brake line below the pressure required to render the brake operative, means whereby pressure in the master cylinder tends to render said limit means inoperative whereupon said valve may hold pressure in the brake line, the bias for said limit means being such that a pressure higher than that required to render the brake operative is required to render said limit means inoperative, whereupon said valve traps pressure in the brake line with said higher pressure released, electric operator means for operating said limit means to by-pass fluid from the brake line, and an electric generator supplying current to said operator means whereby pressure trapped in the brake line is released when said generator is driven.

10. In combination with a hydraulic brake mechanism including a master cylinder and a brake cylinder, an anti-creep brake control unit in the line between said cylinders, said unit including a passageway for conducting fluid from the master cylinder to the brake line, valve means for closing off the passageway and trapping pressure in the brake line, limit means biased for preventing the trapping of pressure in the brake line below the pressure required to render the brake operative, means whereby pressure in the master cylinder tends to render said limit means inoperative whereupon said valve may hold pressure in the brake line, the bias for said limit means being such that a pressure higher than that required to render the brake operative is required to render said limit means inoperative, whereupon said valve traps pressure in the brake line with said higher pressure released, an electric pressure switch in said brake line, electric operator means controlled by said switch for operating said limit means to by-pass fluid from the brake line, and an electric generator supplying current to said operator means whereby pressure trapped in the brake line is released when said generator is driven.

11. For use with a hydraulic brake mechanism including a master cylinder and a brake cylinder, an anti-creep brake control unit for connection in the line between said cylinders, said unit including a body having a passageway for conducting fluid from the master cylinder to the brake line, check valve means biased to close off the passageway, said valve means being arranged so that one face is subject to pressure in the master cylinder line and an opposed face of substantially equal effective area is subject to pressure in the brake line at all times, valve unseating means in said body having an operator portion extending into said passageway and engaging said valve means, said unseating means being biased for preventing closure of said valve below the pressure required to render the associated brake operative, the valve operator portion of said valve unseating means having formed thereon an unbalanced area disposed in said passageway and arranged so that master cylinder pressure in said passageway opposes the bias for said valve unseating means at all times, the relationship of the unbalanced area of said valve operator portion subjected to pressure and the strength of its bias being such that pressure in said passageway higher than that required to render the brake operative lifts said operator portion from the valve means, thereby permitting the check valve bias means to close the valve and pressure on said opposed face of the valve to hold the valve seated to trap pressure in the brake line when pressure in said passageway is reduced.

12. For use with a hydraulic brake mechanism including a master cylinder and a brake cylinder, an anti-creep brake control unit for connection in the line between said cylinders, said unit including a passageway for conducting fluid from the master cylinder to the brake line, check valve means biased for closing off the passageway and trapping pressure in the brake line, said check valve means being arranged so that one face is subject to pressure in the master cylinder line and an opposed face of substantially equal effective area is subject to pressure in the brake line at all times, limit means biased for preventing the trapping of pressure in the brake line below the pressure required to render the brake operative, said limit means including an unbalanced area subject to pressure in the master cylinder line at all times and arranged so that pressure on said area opposes the limit means bias so that pressure in the master cylinder tends to render said limit means inoperative, whereupon the bias on said check valve means may close the valve and pressure on said opposed face of said check valve means may hold closed the valve when master cylinder pressure is released and so trap pressure in the brake line, the bias for said limit means being such that a pressure higher than that required to render the brake operative is required to render said limit means inoperative whereby pressures below a predetermined value are not trapped.

13. For use with a hydraulic brake mechanism including a master cylinder and a brake cylinder, an anti-creep brake control unit for connection in the line between said cylinders, said unit including a passageway for conducting fluid from the master cylinder to the brake line, check valve means biased for closing off the passageway and trapping pressure in the brake line, said check valve means being arranged so that one face is subject to pressure in the master cylinder line and an oposed face of substantially equal effective area is subject to pressure in the brake line at all times, limit means biased for preventing the trapping of pressure in the brake line below the pressure required to render the brake operative, said limit means including an unbalanced area subject to pressure in the master cylinder line at all times and arranged so that pressure on said area opposes the limit means bias so that pressure in the master cylinder tends to render said limit means inoperative, whereupon the bias on said check valve means may close the valve and pressure on said opposed face of said check valve means may hold closed the valve when master cylinder pressure is released and so trap pressure in the brake line, the bias for said limit means being such that a pressure higher than that required to render the brake operative is required to render said limit means inoperative whereby pressures below a predetermined value are not trapped, and pressure relief means in the system to reduce the pressure therein to a predetermined maximum value after brake pressure is released, whereupon said valve traps a predetermined maximum pressure in the brake line, said pressure relief means comprising a spring-loaded valve for discharging into said passageway between the valve and the master cylinder.

14. For use in combination with a hydraulic brake mechanism including a master cylinder and a brake cylinder, an anti-creep brake control unit for connection in the line between said cylinders, said unit including a body formed with a fluid passageway having an inlet chamber for connection to the master cylinder, an outlet chamber for connection to the brake line, and a valve seat between said chambers, valve means in said outlet chamber for closing off said passageway and trapping pressure in the brake line, said valve means being balanced with respect to pressure in said outlet chamber when the brakes are released, means to bias said valve means toward said seat, latch means arranged to normally hold said valve means off said seat, said latch means including an unbalanced area responsive to pressure in said passageway at all times in order to cause said latch means to release said balanced valve means for engagement with said seat in response to said bias means to trap pressure in said outlet chamber.

FRANK J. RAYBOULD.

REFERENCES CITED

The following references are of record in the file of this patent:

UNITED STATES PATENTS

| Number | Name | Date |
|---|---|---|
| 2,217,141 | Sprenkle | Oct. 8, 1940 |
| 2,285,781 | Patrick | June 9, 1942 |